May 9, 1967     L. A. HOPKINS ET AL     3,318,404
AIR CUSHION CENTER OF PRESSURE DISPLACING
MEANS FOR GROUND EFFECT VEHICLES
Filed April 28, 1965     2 Sheets-Sheet 1
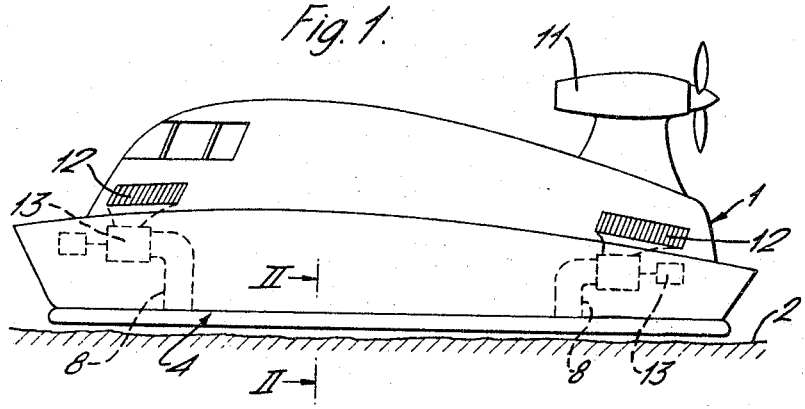
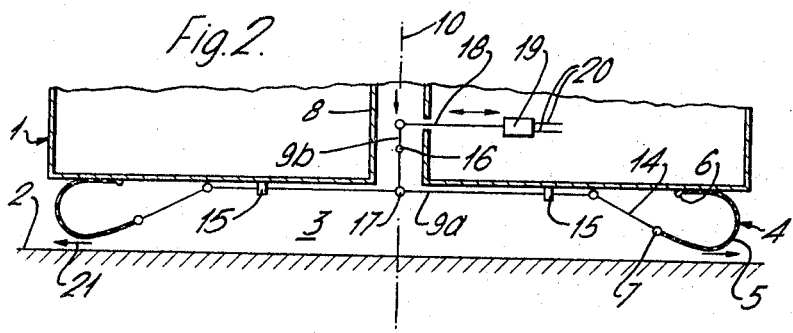
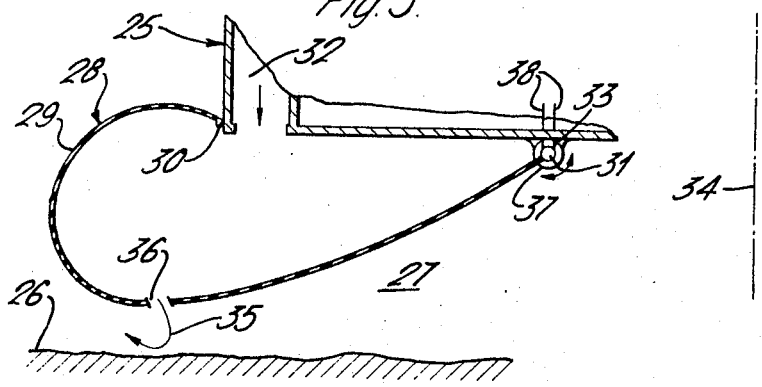
INVENTORS
L.A. HOPKINS
A.R. TRIPP
BY Cameron, Kerkam & Sutton
ATTORNEYS

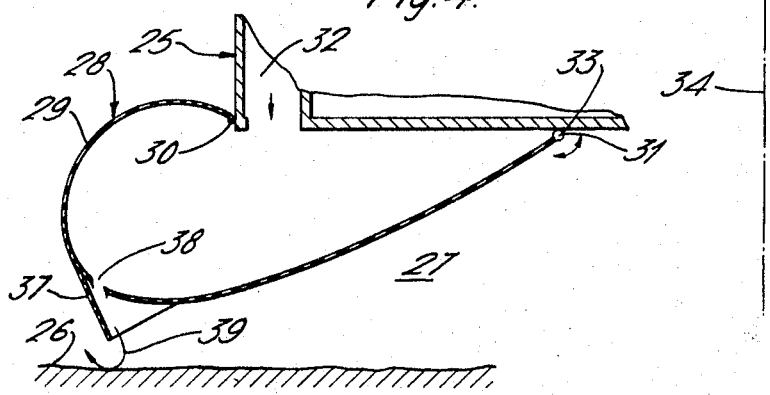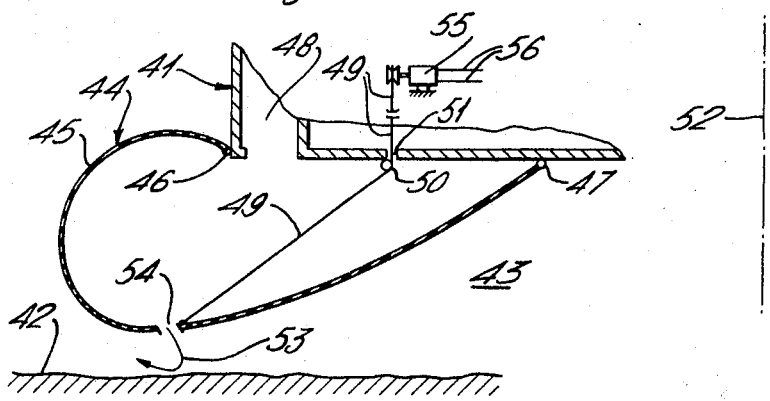

United States Patent Office 3,318,404
Patented May 9, 1967

3,318,404
AIR CUSHION CENTER OF PRESSURE DISPLACING MEANS FOR GROUND EFFECT VEHICLES
Leslie Arthur Hopkins and Alan Ritson Tripp, Southampton, England, assignors to Hovercraft Development Limited, London, England, a British company
Filed Apr. 28, 1965, Ser. No. 451,373
Claims priority, application Great Britain, Apr. 29, 1964, 17,826/64
8 Claims. (Cl. 180—7)

This is a continuation-in-part of co-pending application Ser. No. 316,852, filed Oct. 17, 1963.

This invention relates to gas-cushion vehicles that is to say vehicles for travelling over a surface and which, in operation, are supported above that surface by at least one cushion of pressurised gas contained beneath the vehicle body, the cushion space being bounded, at least in part, by a flexible wall member extending downwardly from the vehicle body.

According to the invention, a vehicle for travelling over a surface, and which, in operation, is supported above that surface by at least one cushion of pressurised gas contained beneath the vehicle body, the cushion space being bounded, at least in part, by a flexible wall member extending downwardly from the vehicle body, has a wall member comprising an inflatable membrane having a cross-section, viewed in a direction normal to the periphery of the cushion, which when inflated, curves outwardly from the vehicle body and thereafter downwardly and inwardly, towards the cushion, means for inflating the membrane, and means for varying the profile of said cross-section so as to displace, in a substantially horizontal direction, the centre of pressure of the cushion relative to the vertical axis passing through the centre of gravity of the vehicle.

The invention provides an arrangement capable of controlling roll and pitch movements in a vehicle.

Three embodiments of the invention will now be described by way of example with reference to the accompanying drawings wherein:

FIGURE 1 is a side view of a vehicle according to the first embodiment,

FIGURE 2 is a section, to an enlarged scale, on the lines II—II of FIGURE 1,

FIGURE 3 is a fragmental section of the second embodiment,

FIGURE 4 illustrates a modification of the embodiment illustrated in FIGURE 3, and FIGURE 5 is a fragmental section of the third embodiment.

Referring to FIGURES 1 and 2, a vehicle 1 travelling over a surface 2 and supported above the surface 2 by a cushion 3 of pressurised air contained beneath the vehicle 1 has the side parts of the cushion periphery contained by a pair of parallel-disposed flexible wall members 4 extending downwardly from the vehicle body. The wall members 4 are of the form described and illustrated in the above-mentioned co-pending application Ser. No. 316,852, each comprising an inflatable membrane 5 having a cross-section, viewed in a direction normal to the periphery of the cushion 3 which, when inflated, extends in a curve from a first edge 6 initially in a direction outwardly from an anchorage point on the vehicle body, thereafter extending downwardly, then inwardly and then upwardly in a substantially continuous curve terminating at a second or "free" edge so as to present on its lower surface a convex face presented towards the surface 2. Each membrane 5 is inflated by air supplied by duct means 8 and means including link members 9a, 9b are provided for displacing, in a horizontal direction, each of the second edges 7 so as to displace in a substantially horizontal direction, and by varying the profile of the membrane cross-section, the centres of gravity of the membrane cross-sections relative to the vehicle 1. This in turn displaces, also in a substantially horizontal direction, the centre of pressure of the cushion 3 relative to the vertical axis 10 passing through the centre of gravity of the vehicle 1.

In further detail, the vehicle 1 is propelled over the surface 2 by an air-screw propeller unit 11. Atmospheric air is drawn through intakes 12 by compressors 13 carried by the vehicle 1, and, after pressurisation, is discharged through the ducts 8. The vehicle 1 is of the so-called plenum chamber type wherein air surplus to that required to form the cushion 3 escapes through small clearances between the lower surfaces of the membranes 5 and the surface 2 as indicated by the arrows 21.

The interiors of the membranes 5 are open to the cushion 3 so that air from the cushion keeps the membranes inflated in order that they each assume the profile described above. As described in said co-pending application Ser. No. 316,852, the profiles of the membranes 5 have a pressure distribution which tends to keep the membranes 5 clear of the surface 2 at all times the cushion 3 is in existence, even when their centres of gravity are displaced in the manner described. Should the clearance between a membrane 5 and the surface 2 tend to decrease, the membrane 5 deflects upwards to maintain the clearance.

The inner edges 7 of the membranes 5 are tied together by tie means comprising tie cords 14 and the link member 9a. The link member 9a is constrained to substantially horizontal reciprocal movement by supports 15 attached to the underside of the vehicle body. The link member 9b is vertically disposed and is pivotally mounted on a support 16 within the duct 8 so that its lower end is pivotally connected to the link member 9a at a connection 17 intermediate the length of the link member 9a. A rod 18 connects the upper end of the link member 9b with an actuating unit 19 under the control, through electrical signal lines 20, of the pilot of the vehicle 1. The arrangement is such that if the pilot causes a movement of the rod 18 to, for example, the left (as viewed in FIGURE 2) this brings about a corresponding movement to the right of the link member 9a. Movement to the right of the link member 9a causes simultaneous displacement to the right of the edges 7 of both membranes 5 so that their centres of gravity are moved to the right also. Hence the centre of pressure of the cushion 3, hitherto coinciding with the axis 10 (i.e., the centre of gravity of the vehicle 1) is moved correspondingly to the right of the axis 10. Conversely, movement of the rod 18 to the right brings about a movement, to the left, of the centre of pressure of the cushion 3.

Thus, if the vehicle 1 rolls, for example to the left, the centre of pressure of the cushion 3 can be moved to the left to restore the vehicle 1 to its original position. Using known devices, such as those shown in FIG. 8 of Patent No. 3,181,636, the centre of pressure of the cushion 3 can, of course, be moved automatically, to restore the vehicle, instead of relying on the reaction of the vehicle pilot.

Membranes similar to the membranes 5 and forming fore and aft parts of the flexible wall members 4 can be displaced in the same manner as described above so as to control pitch of the vehicle 1.

In the above description, displacement of the membranes 5 has resulted without change of area of the cushion. In certain conditions (for example, to control heave) it might be desirable to enlarge or reduce the cushion area without disturbing the cushion centre of pressure. This can be done by displacing the centres of gravity of the membranes 5 in opposite directions, that is, in the present embodiment, by arranging that the edges 7 either come towards each other or move away from each other.

It might also be desirable to reduce or enlarge the cushion area accompanied by a shift in position of the cushion centre of pressure. This can easily be achieved by displacement of only one of the membranes 5 relative to the vehicle 1 whilst the other remains stationary.

Referring now to FIGURE 3, a vehicle 25 (similar to the vehicle 1 of FIGURES 1 and 2) travelling over a surface 26 and supported above the surface 26 by a cushion 27 of pressurised air contained beneath the vehicle 25 has the side parts of the cushion periphery contained in part by downwardly extending flexible wall members 28. The wall members 28 (one only of which is shown) are each in the form of inflatable membranes 29 having a cross-section, viewed in a direction normal to the periphery of the cushion 27, which, when inflated, extend in a curve from a first (anchored) edge 30 initially in a direction outwardly from the cushion 27, thereafter extending downwardly, then inwardly and then upwardly to terminate at a second edge 31 so as to present on its lower surface a convex face presented towards the surface 26. Duct means 32 are provided for inflating each membrane 29 (in a manner similar to that described in connection with the vehicle 1 of FIGURES 1 and 2) and a roller 33 is provided for varying the profiles of the membranes 29 by winding up or by paying out each of the second edges 31 relative to the vehicle 25 so as to vary the positions of their centres of gravity of cross-section and thus vary the effective boundary of the cushion 27. (The effective boundary is chiefly that part of the cushion 27 in contact with the outer surfaces of the membranes 29). This displaces, in turn, the centre of pressure of the cushion 27 relative to the vertical axis 34 passing through the centre of gravity of the vehicle 25. The rollers 33 are rotated by reversible electric motors 37, controlled through electrical signal lines 38 either automatically or by the pilot of the vehicle 25.

The cushion 27 is contained by the combination of the flexible wall members 28 and curtains 35 of moving air issuing from longitudinal ports 36 formed in the bottoms of the membranes 29. Air discharged from the ducts 32 thus not only inflates the membranes 29 but also provides the curtains 35. The cushion 27 is first established by air issuing from the ports 36 and is thereafter contained in part by the air which is then deflected round and out by cushion pressure to form the curtains 35 and in part by the wall members 28.

In a modification of the embodiment illustrated in FIGURE 3, alternatively, or in addition, the edges 30 are attached to a roller mounted on the vehicle body, the roller being rotatable by an electric motor, in the same way as the rollers 33.

In a further modification of the embodiment illustrated in FIGURE 3, one or both of the rollers are replaced by a flexible beam disposed lengthwise along the same axis as that at present occupied by the roller(s) 33, the beam being held at its ends and deflected (e.g., by a hydraulic ram attached to the vehicle body) about a point intermediate its length so as to obtain required displacement of the membrane 29.

In the modification illustrated in FIGURE 4, the membranes 29 are provided with flexible extensions 37 of the type described and claimed in copending applications Ser. No. 267,695, filed Mar. 25, 1963, now abandoned, and Ser. No. 566,948, filed July 21, 1966, the cushion 27 being contained by the combination of the flexible wall members 28, the extensions 37 and curtains 39 of moving air issuing from longitudinal ports 38 formed in the bottoms of the membranes 29 and flowing down the cushion-bounding parts of the extensions 37.

FIGURE 5 illustrates an embodiment wherein a vehicle 41 (similar to the vehicle 25 of FIGURE 3) travelling over a surface 42 and supported above the surface 42 by a cushion 43 of pressurised air contained beneath the vehicle 41 has the side parts of the cushion periphery contained in part by downwardly extending flexible wall members 44. The wall members 44 (one only of which is shown) are each in the form of inflatable membranes 45 having a cross-section, viewed in a direction normal to the periphery of the cushion 43, which when inflated, extends in a curve from a first (anchored) edge 46 initially in a direction outwardly from the cushion 43, thereafter extending downwardly, then inwardly and then upwardly, to terminate at a second edge 47 so as to present on its lower surface a convex face presented towards the surface 42. Duct means 48 are provided for inflating each membrane 45. The cushion 43 is contained by the combination of the flexible wall members 44 and curtains 53 of moving air issuing from longitudinal ports 54 formed in the bottoms of the membranes 45.

The edges 46, 47 of each membrane 45 are anchored to the lower part of the vehicle body and the centre of gravity of the membrane is displaced relative to the vehicle by means of a cord 49 attached to the inner surface of each membrane 45 and which is led over a pulley 50 through a slot 51 in the bottom of the vehicle to be attached to another pulley driven by a reversible electric motor 55 under the control, through electrical signal lines 56, automatically or by the pilot of the vehicle. To vary the position of a centre of gravity of cross-section of a membrane 45, the cord 49 is pulled in or payed out so that this variation is achieved by local distortion of the profile of the membrane.

Variation in position of the centre of gravity varies the effective boundary of the cushion 43 (which boundary is chiefly that part of the cushion 43 in contact with the outer surface of a membrane 45) which in turn displaces, in a substantially horizontal direction, the centre of pressure of the cushion 43 relative to the vertical axis 52 passing through the centre of gravity of the vehicle 41.

We claim:

1. A vehicle for travelling over a surface and which, in operation, is supported above said surface by at least one cushion of pressurized gas contained beneath the vehicle body, comprising a flexible wall member of inflatable construction extending downwardly from the vehicle body for at least partially containing the cushion along one side of the cushion periphery, said wall member having one part fixed to one point on the vehicle body and having a cross-section, viewed in a direction normal to said one side of the cushion periphery, which, when inflated, curves outwardly from said one point on the vehicle body and thereafter downwardly and inwardly, towards the cushion, means for inflating the wall member, and means adjustably connecting another part of the wall member to another point on the vehicle body, said last-named means being operable to displace said other part of the wall member in a substantially horizontal direction relative to the vehicle body and thereby vary the profile of said cross-section, so as to displace, in a substantially horizontal direction, the centre of pressure of the cushion relative to the vertical axis passing through the centre of gravity of the vehicle.

2. A vehicle as claimed in claim 1 wherein said last-named means include tie means attached to the part of the wall member which curves inwardly towards the cushion, and means for varying the effective length of said tie means.

3. A vehicle as claimed in claim 1 wherein said last-named means include roller means attached to at least one part of the wall member, said roller means being mounted on the vehicle body and rotatable about an axis disposed substantially parallel to said one side of the cushion periphery.

4. A vehicle as claimed in claim 1 including a further wall member, the two wall members being disposed along opposite sides of the cushion periphery, and means for varying the profiles of both wall members simultaneously.

5. A vehicle as claimed in claim 1 including a plurality of flexible extensions connected to the downwardly and inwardly curved part of said wall member, said extensions having cushion-bounding portions extending downwardly and inwardly towards the cushion for containing at least part of the cushion.

6. A vehicle as claimed in claim 5 including ports in the bottom part of said wall member adjacent and inboard of the upper ends of said extensions through which air issues from within said wall member and flows downwardly along the cushion-bounding portions of said extensions to form cushion-containing curtains below said extensions.

7. A vehicle as claimed in claim 1 wherein said last-mentioned means include tie means attached to the inner surface of the part of said wall member which curves inwardly towards the cushion, and means carried by the vehicle body for varying the effective length of said tie means.

8. A vehicle as claimed in claim 1 wherein said last-mentioned means include a tie cord attached at one end to the inner surface of the part of said wall member which curves inwardly towards the cushion, a pulley carried by the vehicle body to which the other end of said cord is attached, and means for rotating said pulley in opposite directions to pull in and pay out said tie cord so as to vary the effective length thereof.

References Cited by the Examiner

UNITED STATES PATENTS

| | | | |
|---|---|---|---|
| 3,096,728 | 7/1963 | Amman et al. | 180—7 X |
| 3,139,947 | 7/1964 | Beardsley | 180—7 |
| 3,209,847 | 10/1965 | Beardsley | 180—7 |
| 3,251,430 | 5/1966 | Veryzer | 180—7 |

FOREIGN PATENTS

| | | |
|---|---|---|
| 824,834 | 5/1963 | Great Britain. |
| 1,377,636 | 9/1964 | France. |

A. HARRY LEVY, *Primary Examiner.*